Patented Feb. 22, 1949

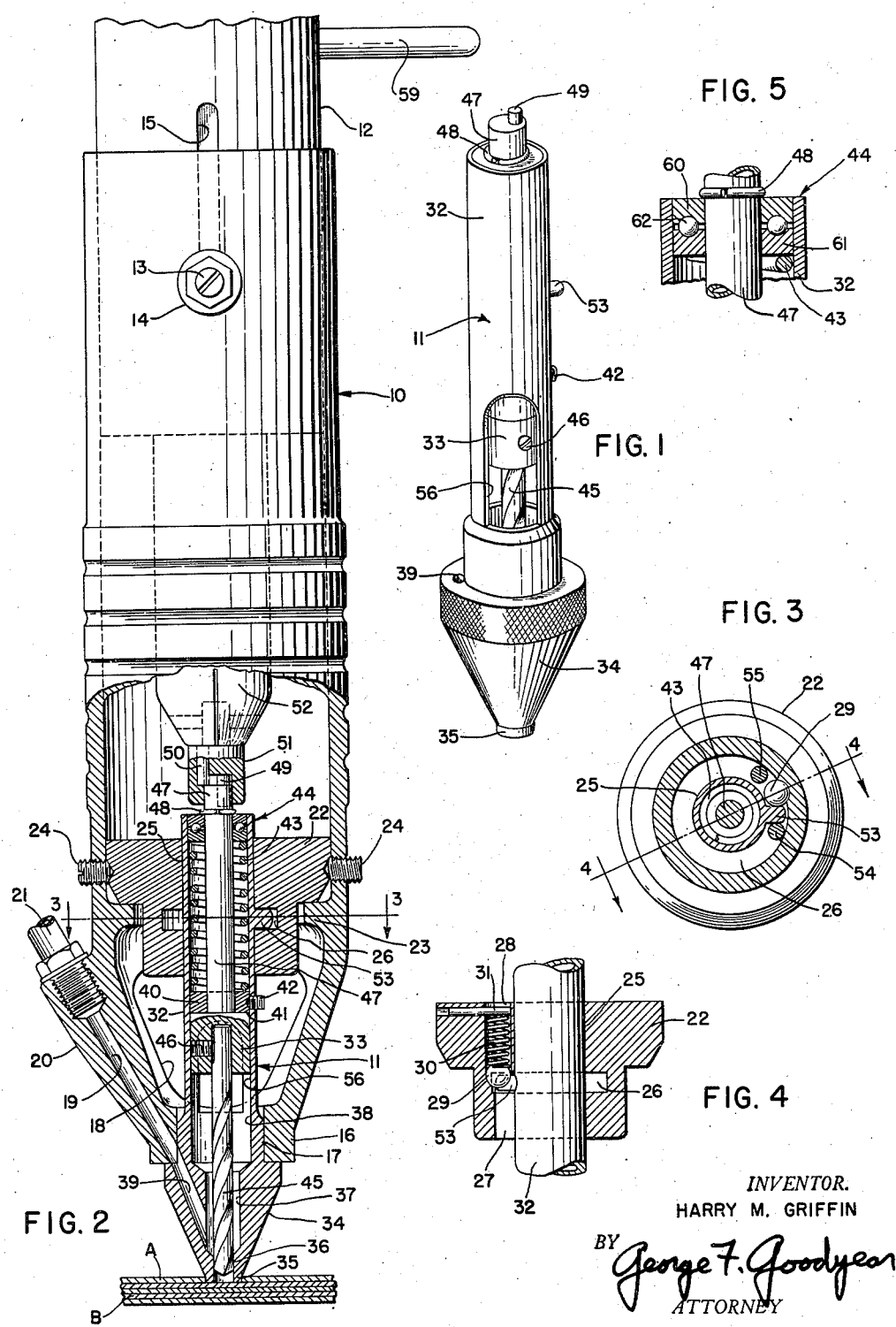

2,462,386

UNITED STATES PATENT OFFICE 2,462,386

TOOL ASSEMBLY

Harry M. Griffin, Webster Groves, Mo., assignor to Curtiss-Wright Corporation, a corporation of Delaware Application April 10, 1945, Serial No. 587,636

10 Claims. (Cl. 77—55)

1

This invention relates to tool holding and driving equipment. More particularly, it relates to a drill chuck and guide combination which is safe and which can be quickly changed to a similar combination of different size.

In the art of drilling cylindrical holes in solid objects, such as metal sheets or blocks, power-operated drill presses have been used to a very wide extent. In the use of such machines, it is often desired to drill holes of many different types and sizes with one machine. This necessitates frequent changing of the drill bits which act as the operating tools in the machines. For most efficient operation, its obviously desirable to effect these changes quickly and safely.

It is therefore an object of this invention to provide mechanism for quickly changing drills. It is another object to provide such a mechanism in which changes can be effected quickly with minimum danger of injury to the operator. It is a further object to provide a combination drill chuck and drill guide which can be readily removed and replaced without the use of tools or wrenches and while the driving unit is in operation without injury to the operator. A still further object is to provide a quick change drill chuck and guide which can be removed and replaced while the air and lubricant supply continues and without the time consuming operation of disconnecting and connecting the air and lubricant supply line. Other objects will appear hereinafter.

These objects are accomplished by the herein described invention, which may be more readily understood by reference to the accompanying drawings, in which: Figure 1 is a perspective view of a combination drill chuck and drill guide according to the present invention; Figure 2 is a partly sectional and partly elevational view of the chuck and guide of Figure 1 installed in a vertical chuck housing of a stack drilling machine; Figure 3 is a cross section taken along the line 3—3 of Figure 2, with the outer casing removed for convenience in illustration; Figure 4 is a section taken along the line 4—4 of Figure 3; and Figure 5 is an enlarged view of a portion of Figure 2.

Referring now to the drawings, an assembled embodiment of this invention, as illustrated in Figures 1 and 2, comprises an outer housing 10 and quick change drill chuck and guide unit 11, the housing 10 constituting a non-rotating support for the unit 11. The housing 10 is of hollow cylindrical form and is adapted to slidingly engage a mating cylindrical non-rotating extension

2

12 of a suitable drilling machine. The extension 12 may be moved up and down by any well-known and suitable means, such as a handle 59. A set screw 13 threaded into and through a boss 14 formed on the upper portion of housing 10 engages a longitudinal slot 15 in extension 12 to prevent relative rotation of the two parts while allowing sliding longitudinal movement thereof. The lower end of housing 10 is tapered inwardly to provide a head 16 having a bore 17 for receiving and positioning the drill chuck and guide unit 11, the tapered portion above head 16 having openings 18 for the removal of drilling chips. Extending upward and outward from the intersection of the bore 17 and the lower face of head 16 is a passage 19 in a boss 20, the upper end of which is threaded to receive a fitting terminal of a flexible hose 21 from a suitable source of air and lubricant supply.

A locking collar 22, positioned against an annular ledge 23 in housing 10 and secured in fixed position therein by set screws 24, is provided with a central opening 25, an internal annular groove 26 and a longitudinal slot 27 (see Figure 4) extending upwardly from the lower face of the collar to the groove 26. Aligned with slot 27 and extending downwardly from the upper face of the collar 22 to the groove 26 is an opening 28 adapted to receive a locking ball 29 and a compression spring 30 held in place by a pin 31, all as shown in Figures 3 and 4 and for a purpose later described.

The drill chuck and guide unit 11 comprises a guide body or chuck housing 32 and a drill holder or chuck 33 slidably and rotatably mounted therein, the chuck housing 32 being sized over a part of its length to fit snugly into bore 17 in housing 10 and opening 25 in collar 22. An enlarged partially knurled end portion 34 of the body is tapered to terminate in an end bushing 35 sized to fit, when in use, into a mating hole in a suitable drilling template A. A drill guide opening 36 in the lower end of the body terminates in a larger bore 37 which is again enlarged into a bore 38. A passage 39 extends angularly from a point above the end portion 34 to the bore 37 and, when unit 11 is properly assembled to housing 10, forms a continuation of the passage 19 to furnish air and lubricant to the drill immediately above the guide opening 36 for lubricating the drill and blowing away the drilling chips. A collar 40 is secured in the housing 32 by a set screw 42 and provides a base for a compression spring 43 overlying which is a ball bearing assembly 44 slidable and rotatable with respect to chuck housing 32 and also with respect to drill chuck 33. The collar 40 also serves as a stop to limit upward movement of drill chuck 33 by abutment against a shoulder 41 on chuck 33. The drill chuck 33, to the lower end of which is secured a drill 45 as by set screw 46, is provided with an integral stem portion 47 of reduced diameter extending upwardly through collar 40 and bearing 44. A split ring 48 seated in a groove in the stem 47 above the bearing 44 serves to hold the parts 44 and 33 in assembled relationship, against the resistance of spring 43. A clutch element 49, shown as a pin for convenience in illustration, extending upwards from stem 47, is adapted to be engaged for driving purposes by a cooperating clutch element 50, also shown as a pin, in an adapter 51 which is locked in a rotatable or driven part or shaft 52 of the drilling machine, this rotatable part 52 moving up and down in unison with extension 12 and constituting the tool driving part of the machine.

The ball bearing assembly 44 comprises an upper race 60 and a lower race 61, with balls 62 therebetween. Since spring 43, which is normally stationary, as will be seen hereinafter, bears against lower race 61, the lower race will also normally remain stationary. Likewise, since split ring 48, which normally rotates during operation, bears against upper race 60, the upper race will normally rotate in unison with the rotating parts of the mechanism.

As a means for locking the drill chuck and guide unit 11 into the housing 10 there is provided a lug 53 projecting outwardly from housing 32. Upon insertion of the unit 11 into the housing 10 the lug will pass along slot 27, depress ball 29 and spring 30 and then, upon rotation of the body 32 in the same direction as the drill rotation, will pass into groove 26, the rotation being limited by a stop pin 54, mounted in collar 22. To prevent rotation of the body 32 in the reverse direction, a stop pin 55 mounted in collar 22 is provided, which will also aid in aligning the lug 53 with slot 27 upon the desired removal of the unit 11. The housing 32 is provided with suitable openings 56 for the removal of drilling chips.

In operation, the driving head 52 and extension 12 of the drilling machine is lowered, as by handle 59, allowing the operator to guide the end bushing 35 into the mating hole of the template A. Further lowering of the lever will cause the housing 10 to telescope with respect to extension 12 and driving shaft 52. This in turn forces drill chuck 33 and drill 45, together with ball bearing assembly 44, downwardly against the resistance of spring 43, so that drill 45 enters the stack of metal sheets 13.

It should be noted that the drill and all rotating parts are enclosed in the stationary housing 10 and guide body 32 preventing any possible injury to the operator. When it is necessary to change drills, which may be required three to five times during the drilling of a single stack of sheets, the operator grasps the knurled portion of head 34, rotates it against the rotation of the drill, and slides the entire drill chuck and guide unit 11 from the housing. He then replaces it with another desired size unit, the entire changing operation being effected without stopping the machine or the air and lubricant supply.

Although the invention has been described with reference to a specific embodiment thereof, it is understood that it is not to be limited except as defined by the appended claims.

I claim:

1. A quick change tool chuck assembly, comprising a housing, an opening in one end of said housing arranged to permit the projection of a tool therefrom, a tool holder slidably and rotatably disposed in said housing and with one end thereof adjacent to the opposite end of said housing, a clutch member on said end of said tool holder, a first stop member fixedly disposed in said housing and serving to limit the sliding movement of said tool holder in the direction of its said end, a second stop member disposed on said tool holder adjacent its said end, a bearing assembly slidably and rotatably disposed between said tool holder and said housing and limited in its travel towards said end of the tool holder by said second stop member, and spring means within the housing between said first stop member and said bearing assembly serving to urge said tool holder in the direction of its said end.

2. A quick change tool chuck assembly, comprising a housing, means for detachably locking said housing to a support, an opening in one end of said housing arranged to permit the projection of a tool therefrom, a tool holder slidably and rotatably disposed in said housing and with one end thereof adjacent to the opposite end of said housing, a clutch member on said end of said tool holder, a first stop member fixedly disposed in said housing and serving to limit the sliding movement of said tool holder in the direction of its said end, a second stop member disposed on said tool holder adjacent its said end, a bearing assembly slidably and rotatably disposed between said tool holder and said housing and limited in its travel towards said end of the tool holder by said second stop member, and spring means within the housing between said first stop member and said bearing assembly serving to urge said tool holder in the direction of its said end.

3. A quick change tool chuck assembly, comprising a housing, means for detachably locking said housing to a support, an opening in one end of said housing arranged to permit the projection of a tool therefrom, tool positioning means adjacent said one end of said housing, a tool holder slidably and rotatably disposed in said housing and with one end thereof adjacent to the opposite end of said housing, a clutch member on said end of said tool holder, a first stop member fixedly disposed in said housing and serving to limit the sliding movement of said tool holder in the direction of its said end, a second stop member disposed on said tool holder adjacent its said end, a bearing assembly slidably and rotatably disposed between said tool holder and said housing and limited in its travel towards said end of the tool holder by said second stop member, and spring means within the housing between said first stop member and said bearing assembly serving to urge said tool holder in the direction of its said end.

4. In a tool assembly having an extension carrying a rotatable tool driving element and movable towards and away from objects to be treated, an outer housing slidably connected with said extension and enclosing said tool driving element, an opening in the outer end of said outer housing, a tool chuck unit removably positioned in said opening, said unit including a chuck housing having an external opening and an inner slidable and rotatable chuck element, means connected to said outer housing and to said chuck housing for detachably locking said housings in fixed relationship to each other, clutch means for connecting the inner end of said chuck element to said tool driving element, and means for moving said extension, chuck element and housings toward the objects to be treated and then continuing the movement of said extension and chuck element toward the objects to be treated while said housings remain stationary.

5. In a tool assembly having an extension carrying a rotatable tool driving element and movable toward and away from objects to be treated, an outer housing slidably connected with said extension and enclosing said tool driving element, an opening in the outer end of said outer housing, a tool chuck unit removably positioned in said opening, said unit including a chuck housing having an external opening and an inner slidable and rotatable chuck element, means connected to said outer housing and to said chuck housing for detachably locking said housings in fixed relationship to each other, clutch means for connecting the inner end of said chuck element to said tool driving element, resilient means urging said chuck element and said tool driving element into clutching contact and also urging said chuck element away from the external opening of said chuck housing, and means for moving said extension, chuck element and housings toward the objects to be treated and then continuing the movement of said extension and chuck element toward the objects to be treated while said housing remains stationary.

6. In a tool assembly having a rotatable and axially movable drive shaft, a non-rotating outer housing around the drive shaft arranged for axial movement relative thereto, a tool chuck unit including a non-rotating chuck housing and a chuck element mounted therein for axial and rotational movements, the chuck housing having an opening in one end thereof to permit the projection therefrom of a tool carried by the chuck element, the chuck element having a clutch member adapted for detachable driving engagement with the drive shaft within said outer housing, and means for detachably connecting the chuck housing to the outer housing for axial movement therewith, the clutch member being arranged to come into driving engagement with the drive shaft as the housings are brought into connected relationship.

7. In a tool assembly having a rotatable and axially movable drive shaft, a non-rotating outer housing around the drive shaft arranged for axial movement relative thereto, a tool chuck unit including a non-rotating chuck housing and a chuck element mounted therein for axial and rotational movements, the chuck housing having an opening in one end thereof to permit the projection therefrom of a tool carried by the chuck element, the chuck element having a clutch member adapted for detachable driving engagement with the drive shaft within said outer housing, resilient means in the chuck housing for urging movement of the chuck element to retract such tool into the chuck housing, and means for detachably connecting said chuck housing to the outer housing for axial movement therewith, the clutch member being arranged to come into driving engagement with the drive shaft as the housings are brought into connected relationship.

8. In a tool assembly having a rotatable and axially movable drive shaft, a non-rotating outer housing telescoping the drive shaft and arranged for axial movement relative thereto, a tool chuck unit including a chuck housing and a chuck element mounted therein for axial and rotational movements, means for detachably connecting said housings in telescoping relation, drive connection means within the outer housing for connecting the chuck element to the drive shaft when said housings are connected, the chuck housing having an opening in one end thereof to permit projection therefrom of a tool carried by the chuck element, and resilient means within the chuck housing for urging movement of the chuck element to retract such tool into the chuck housing and to hold the drive connection means engaged when the housings are connected.

9. A quick change tool chuck assembly for attachment to a machine having a rotatable drive member and a non-rotating support movable axially relative to the drive member, said assembly comprising a housing, means for detachably interlocking said housing with the non-rotating support for axial movement as a unit therewith, an opening in one end of said housing arranged to permit the projection of a tool therefrom, a tool holder slidably and rotatably disposed in said housing and with one end thereof adjacent to the opposite end of said housing, a clutch member on said end of said tool holder arranged to enter into driven engagement with the rotatable drive member when said housing is brought into interlocked relationship with said non-rotating support, a stop member fixedly disposed in said housing and serving to limit sliding movement of said tool holder in the direction of its said end, and resilient means within the housing normally urging said tool holder in the direction of its said end.

10. A quick change tool chuck assembly for attachment to a machine having a rotatable drive member and a non-rotating outer housing extending around and axially movable relative to the drive member, said assembly comprising a non-rotating tubular housing, means for detachably interlocking the housing with the non-rotating support for axial movement as a unit therewith, the housing having an opening in one end thereof to permit the projection of a tool therefrom, a tool holder mounted for axial and rotational movement in said housing, said tool holder at the end thereof adjacent said opening having a tool engaging chuck within the housing, said tool holder having a clutch member at the opposite end thereof adapted to enter into driven engagement with the rotatable drive member when said tubular housing is brought into interlocked relation with said outer housing, and resilient means within the housing for urging axial movement of the tool holder in a direction to retract such tool into the housing.

HARRY M. GRIFFIN.

REFERENCES CITED

The following references are of record in the file of this patent:

UNITED STATES PATENTS

| Number | Name | Date |
|---|---|---|
| 853,570 | Wogaman | May 14, 1907 |
| 994,430 | Tunks | June 6, 1911 |
| 2,170,211 | Osborne | Aug. 22, 1939 |
| 2,294,303 | Jagow | Aug. 25, 1942 |
| 2,296,087 | Burns, Jr. | Sept. 15, 1942 |
| 2,308,055 | Cogsdill | Jan. 12, 1943 |
| 2,335,614 | Spievak | Nov. 30, 1943 |
| 2,359,859 | Jarvis | Oct. 10, 1944 |